United States Patent [19]
Iddan et al.

[11] Patent Number: 5,512,749
[45] Date of Patent: Apr. 30, 1996

[54] INFRARED MICROSCOPE

[75] Inventors: Gavriel J. Iddan, Haifa; Ephraim Pinsky, Kiryat Tivon; Gavriel Catalan, Qiryat Motzkin, all of Israel

[73] Assignee: Rafael-Armament Development Authority, Haifa, Israel

[21] Appl. No.: 344,594

[22] Filed: Nov. 18, 1994

[30] Foreign Application Priority Data

Nov. 26, 1993 [IT] Italy ............................. 107763

[51] Int. Cl.⁶ ............................................ H04N 5/33
[52] U.S. Cl. ................... 250/332; 250/334; 250/370.08
[58] Field of Search ............................. 250/332, 334, 250/352, 370.08

[56] References Cited

U.S. PATENT DOCUMENTS

| 4,692,618 | 9/1987 | Klatt | 250/332 |
| 4,705,945 | 11/1987 | Worcester | 250/334 |
| 4,754,704 | 7/1988 | Lubbers . | |
| 4,807,532 | 2/1989 | Anderson et al. . | |
| 5,075,553 | 12/1991 | Noble et al. | 250/334 |

FOREIGN PATENT DOCUMENTS

| 143419 | 11/1980 | Japan | 250/334 |
| 1124728 | 5/1989 | Japan | 250/332 |

OTHER PUBLICATIONS

"The Infrared Handbook" rev. ed., Wolfe, W. & Zissis, G., eds, The Infrared Information and Analysis (IRIA) Center, Environmental Research Institute of Michigan (1985), Figure 7-5.

Yasuda, A. et al "Direct Measurement of Localized Joule Heating in Silicon Devices By Means of Newly Developed High Resolution IR Microscopy" IEEE/IRPS Journal pp. 245–249 (1991).

Shell, M. et al "Applications of Infrared Microscopy for Bond Pad Damage Detection" IEEE/IRPS Journal pp. 152–159 (1991).

*Primary Examiner*—Carolyn E. Fields
*Attorney, Agent, or Firm*—Mark M. Friedman

[57] ABSTRACT

A staring infrared microscope which includes optics for focusing a magnified image of an object onto a 2D array detector of IR sensitive elements, a processor for processing the information received from the 2D array detector, including controlling the integration time of the 2D array detector as a function of the magnification of the object to generate a thermal descriptive image of object, and a display for displaying the thermal descriptive image. Also disclosed is a scanning infrared microscope which includes optics for focusing a magnified image of an object onto a linear array detector of IR sensitive elements including a scanning mirror for scanning the object and a processor for processing the information received from the linear array detector to generate a thermal descriptive image of object. The scanning infrared microscope further includes an output display for displaying the thermal descriptive image.

9 Claims, 3 Drawing Sheets

INFRARED MICROSCOPE

FIELD AND BACKGROUND OF THE INVENTION

The present invention relates to infrared (IR) microscopy and thermal analysis generally and, more particularly, to a staring infrared microscope (IRM) for operating in the medium and long wave IR subregions. The present invention also relates to a scanning IRM for operation in the long wave IR subregion.

IRMs include optics for focusing IR radiation on IR sensitive detectors for producing an electric signal having an intensity proportional to the IR signal intensity impinging thereon. For staring and scanning IRMs, IR detectors are typically prepared from InSb and Cd.Hg.Te (CMT) semiconductor material, respectively. Other suitable materials are described in a chart entitled "Transmission regions of optical materials" in The Infrared Handbook, pg. 7–17 prepared by The Infrared Information and Analysis (IRIA) Center, Environmental Research Institute of Michigan.

The performance rating of an IRM is typically described in terms of two parameters. First, its spatial resolution defined as the smallest distinguishable dimension of an object. Second, its thermal sensitivity defined as the smallest distinguishable temperature difference between adjacent portions of an object. For convenience, thermal sensitivity performance is often given in terms of its noise equivalent temperature (NET) which is the temperature difference equivalent to the RMS noise signal.

Various infrared microscopes and their use in a range of infrared microscopy and thermal analysis applications, for example, non-destructive failure analysis of integrated circuits, microprocessors etc., and bio-engineering applications, such as identification of bacteria are now described.

Shell et al., in "Applications of Infrared Microscopy for Bond Pad Damage Detection", in the 1991 IEEE/IRPS Journal, pp. 152–159, which describe an IRM operating in the wavelength region of about 0.8 to 1.8 microns for the non-destructive failure analysis of plastic encapsulated devices.

Yasuda et al., in "Direct Measurement of Localized Joule Heating in Silicon Devices by Means of Newly Developed High Resolution IR Microscopy", in the 1991 IEEE/IRPS Journal pp. 245–249, which is described an IRM which combines a ZnS objective lens and a Hg.Cd.Te IR detector having a maximum sensitivity around the 8 to 12 μm wavelength to achieve a practical spatial resolution of 10 μm and temperature resolution of 0.24K°.

PCT Patent Application PCT/DE90/00081 to Bruker Analytische Messtechnik GMBH entitled "Process and Device for Rapid Detection of Micro-organisms in Samples", which is incorporated by reference as if fully set forth herein, describes a process and a device whereby IR radiation is passed through a culture for obtaining the number of microorganisms in a sample and for identifying specimens using IR spectra information.

Several shortcomings of the above described IRMS include low thermal sensitivity particularly at high magnifications and the use of optics and other items, for example cold shields, which have not been engineered to achieve optimum performance in medium and long wave IR applications.

There is thus a widely recognized need for, and it would be highly desirable to have, a staring IR microscope having a magnification capability of up to 40X or thereabouts while rendering a thermal sensitivity of 0.02K° at a spatial resolution of 3 μm. Such a staring IRM can be used for the above mentioned applications and other bio-engineering applications such as differentiation between microbiological specimens, the determination of the morphology of tissues, and comparison of growth rate between different cultures for creating a database of metabolic growth rates of bugs, tissues, micro-organisms and the like for comparative and correlation purposes.

The staring IRM is capable of providing up to 40X magnification or thereabouts without loss of thermal sensitivity by virtue of novel control apparatus which adapts the integration time T of the IR detector as a function of the magnification M of the IRM's optics according to, but not limited to, the following function:

$T=k(M+1)^2$ where $k$ is a constant

Still further, it would be highly advantageous to have a combined visible and staring IRM for displaying ongoing temperature changes during thermal rate processes to facilitate recognition and evaluation of the object under examination by the user.

SUMMARY OF THE INVENTION

According to the present invention, there is provided a staring infrared microscope, comprising: (a) optics for focusing a magnified image of an object onto a 2D array detector of IR sensitive elements; (b) processing means for processing the information received from the 2D array detector including controlling the integration time of the 2D array detector as a function of the magnification of the object to generate a thermal descriptive image of the object; and (c) output means for displaying the thermal descriptive image.

According to further features in the preferred embodiment, the 2D array detector is made from InSb, CMT or GaAs material and is mounted on a cryogenically cooled cold finger housed in a dewar assembly for maintaining the cryogenic environment. The 2D array detector is protected by a cold shield against ambient thermal noise by limiting the dimensions of its aperture to the dimensions of the virtual image entrance pupil of the optics, thereby considerably reducing spurious IR radiation impinging thereon. The optics are preferably diffraction limited optics.

The staring IRM can be provided with a display means incorporating a CCD camera for displaying a visible light image of the object to facilitate recognition and evaluation of the object under examination by the user.

According to the present invention, there is also provided a scanning infrared microscope, comprising: (a) optics for focusing a magnified image of an object onto a linear array detector of IR sensitive elements including a scanning mirror fiber scanning the object; (b) processing means for processing the information received from the linear array detector to generate a thermal descriptive image of object; and (c) output means for displaying the thermal descriptive image.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a staring IRM operating in medium and long wave IR subregions for use in a wide range of infrared microscopy and thermal analysis applications including, but not limited to, non-destructive failure analysis of integrated circuits, microprocessors etc, and bio-engineering applications, such as identification of bacteria, such as differentiation between microbiological specimens, the determination of the morphology of tissues, and comparison of growth rate between different cultures for creating a database of metabolic growth rates of bugs, tissues, micro-organisms and the like for comparative and correlation purposes.

The present invention is also of a scanning IRM operating in the long wave IR subregion for use in the same range of applications, however, at a lower thermal sensitivity and spatial resolution.

The principles and operation of the staring and scanning IRMs according to the present invention may be better understood with reference to the drawings and the accompanying description.

Figure 1:
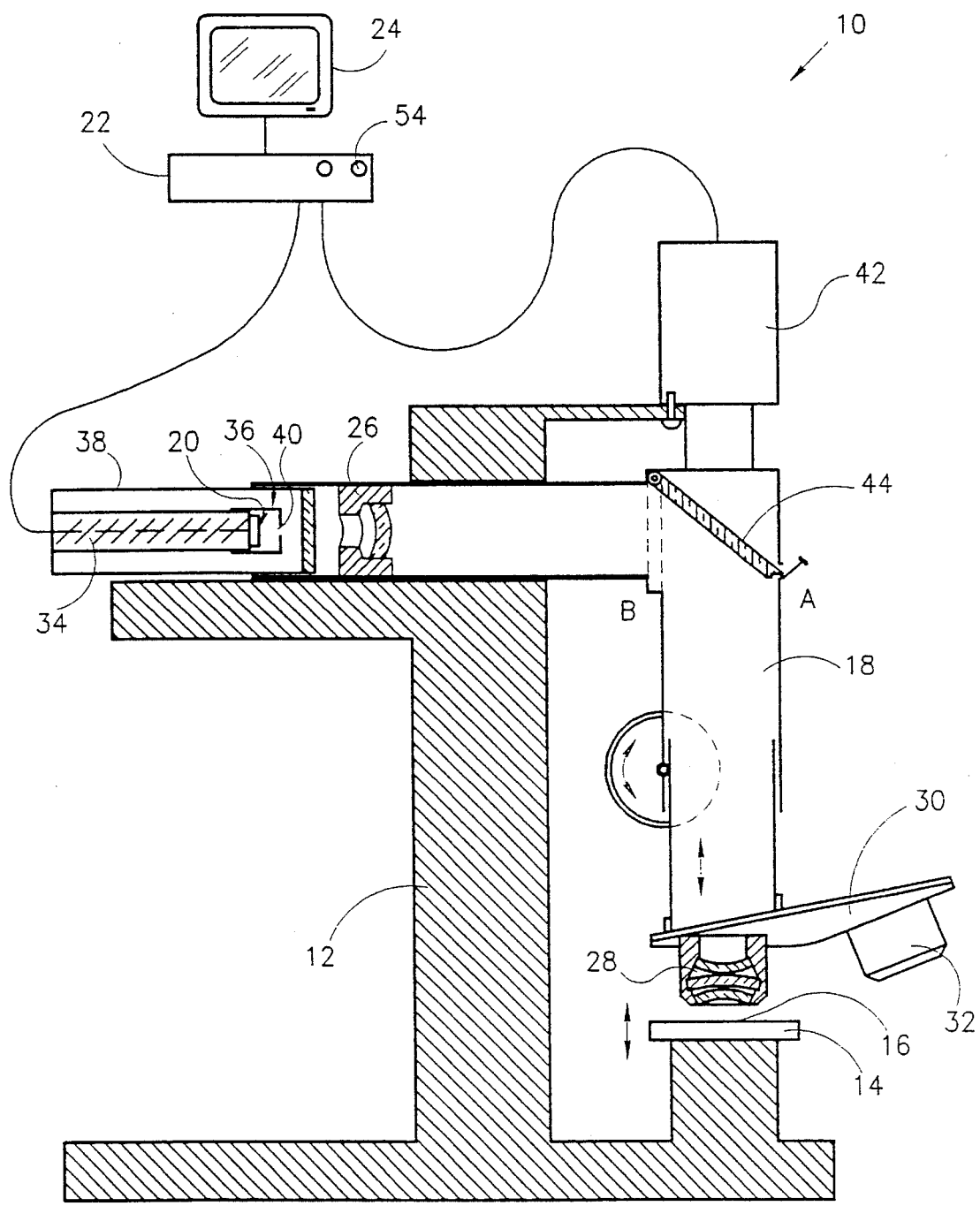
FIG. 1 shows a staring infrared microscope (IRM) according to the present invention equipped with a visible light channel.

Referring now to the drawings, FIG. 1 illustrates a preferred embodiment of a staring infrared microscope, generally designated 10, according to the teachings of the present invention.

Staring IRM 10 generally comprises a frame 12, a stage 14 for supporting an object 16, an optical channel 18 for imaging IR radiation emitted from object 16 onto an IR detector 20 and processing means 22 for processing the information received from IR detector 20 to generate a thermal descriptive image of object 16 which is displayed on a CRT 24 or other suitable output device.

Optical channel 18 preferably comprises diffraction limited back end optics 26 and objective optics 28 for focusing the IR radiation emitted from object 16 onto IR detector 20. Objective optics 28 is enclosed in an objective lens 32 and optical channel 18 preferably terminates in a rotatable turret 30 carrying typically four objective lenses 32, thereby providing a typical magnification range of up to 40X. Focusing of staring IRM 10 is enabled by providing stage 14 and optical channel 18 with vertically displaceable, rack and pin or other suitable telescopic means to enable the user to render sharper images on CRT 24 by adjusting the distance between object 16 and objective lens 32 in use.

IR detector 20 is mounted on a cryogenically cooled cold finger 34 and protected by a cold shield 36 against ambient thermal noise. Cold finger 34 and cold shield 36 are enclosed in dewar assembly 38 where the cryogenic environment is maintained by a cryogenic cooler for example, a Joule Thompson (JT) cooler, a liquid nitrogen cooler, or a Sterling cooler.

It is a particular feature of the present invention that the dimensions of cold shield aperture 40 are limited to the dimensions of the virtual image entrance pupil of objective optics 28, thereby considerably reducing spurious IR radiation impinging on IR detector 20.

Staring IRM 10 is preferably equipped with a conventional CCD camera 42 for displaying a visible light image of object 16 on CRT 24 to facilitate recognition and evaluation of the object by the user. To support CCD camera 42, optical channel 18 is fitted with a displaceable mirror 44 having two operative positions denoted A shown in full lines and B shown in dashed lines for displaying the thermal descriptive and visible light images of object 16, respectively, on CRT 24. It should be noted that at least one of objective lenses 32 be adapted for visible light for operation of CCD camera 42.

In contradiction to the above, it will be appreciated that a material, for example ZnS, can be used for objective optics 28 and mirror 44 such that both IR detector 20 and CCD camera 42 can be operated simultaneously. However, the thermal sensitivity of IRM 10 is typically impaired in such a configuration.

Figure 2:
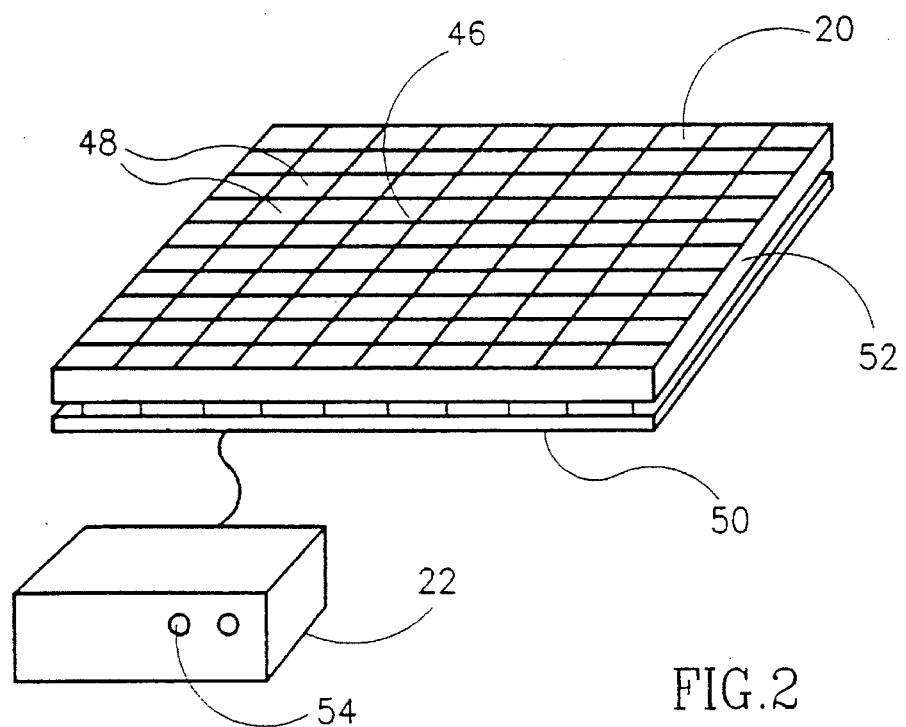
FIG. 2 shows a close-up view of the IR detector of the staring IRM of FIG. 1.

With particular reference to FIG. 2, IR detector 20 comprises a two dimensional (2D) array 46 of, but not limited to, 128×128 or 256×256 IR sensitive elements 48 for producing electric signals having intensities proportional to the IR energy impinging thereon. IR sensitive elements 48 are made from IR sensitive semiconductor material, including but not limited to InSb, commercially available from Amber Engineering, Goleta, Calif., USA.

Processing means 22 includes a processor 50 underlying IR detector 20 for multiplexing and amplifying the signals from IR sensitive elements 48 before their transmission thereto. Processor 50 is situated at the focal plane of optics channel 18 and is known in the art as a focal plane processor (FPP) while the configuration of IR detector 20 and processor 50 is known as a focal plane array (FPA) 52. FPA 52 achieves a cleaner amplification because of the small point-to-point distance between detector 20 and processor 50.

It is a particular point of the invention that processing means 22 varies the integration time T of FPA 52 as a function of the magnification M of the objective lens 32 in use to maintain the thermal sensitivity of 0.02 K° at a spatial resolution of 3 μm according to, but not limited to, the following expression:

$T=k(M+1)^2$ where $k$ is a constant

Processing means 22 can be provided with user operable means 54 selecting the desired integration time or alternatively objective lenses 32 can be provided with identification means for recognition by processing means 22 for selection of the required integration time.

Figure 3:
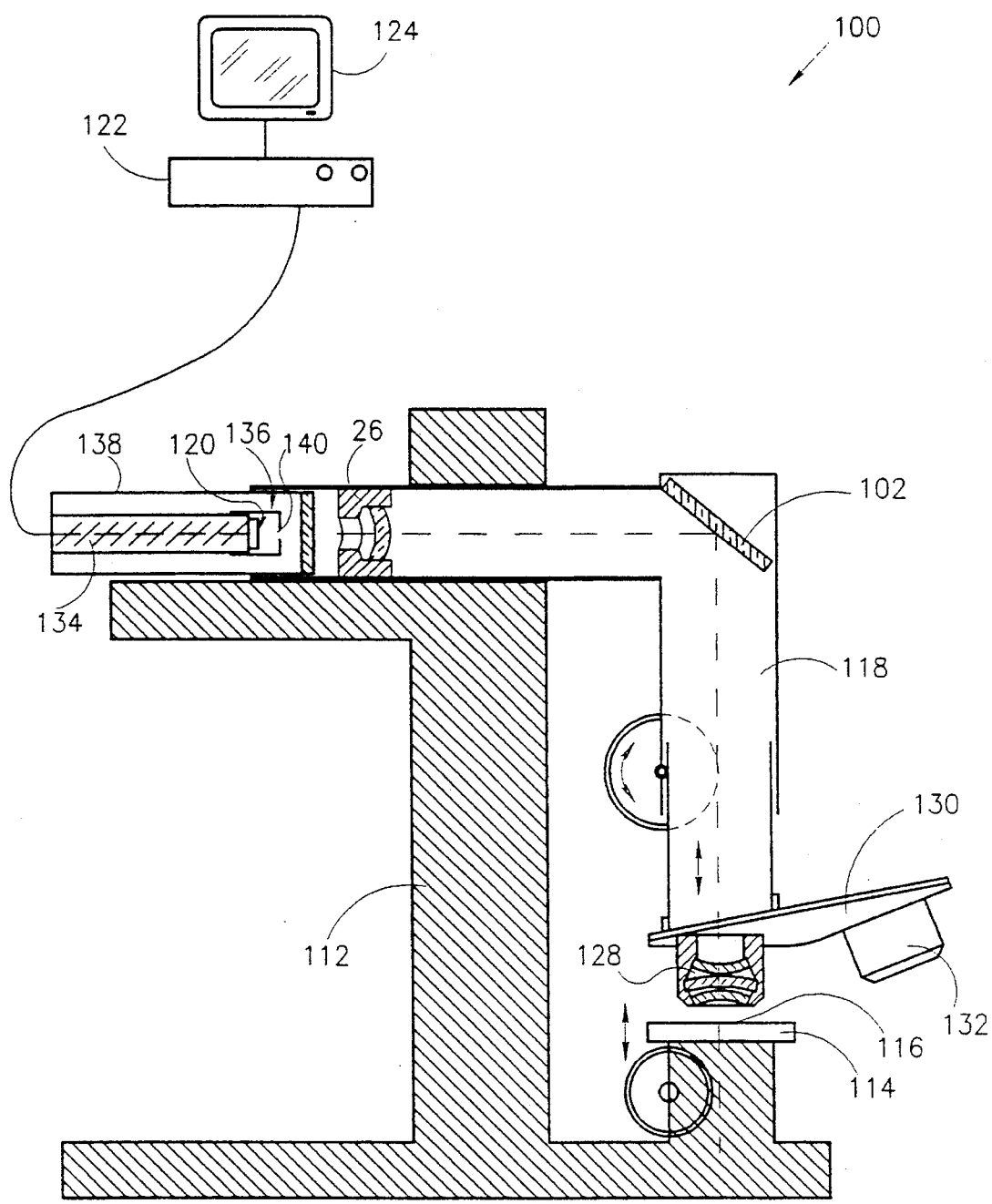
FIG. 3 shows a scanning infrared microscope according to the present invention.

With reference now to FIG. 3, a scanning IRM 100 is shown comprising a similar structure to staring IRM 10 and therefore numbered likewise.

The major differences between scanning IRM 100 and staring IRM 10 is that scanning IRM 100 includes a scanning mirror 102 having a single degree of freedom along the Y axis for scanning object 116 and IR detector 120 comprises a linear array 104 as described in greater detail with reference to FIG. 4. The cycle time of scanning mirror 102 is related to the frame time of the video standard of CRT 124 such that the dwell time for a 500 line CRT 124 is typically, but not limited to, 64 μsec.

Figure 4:
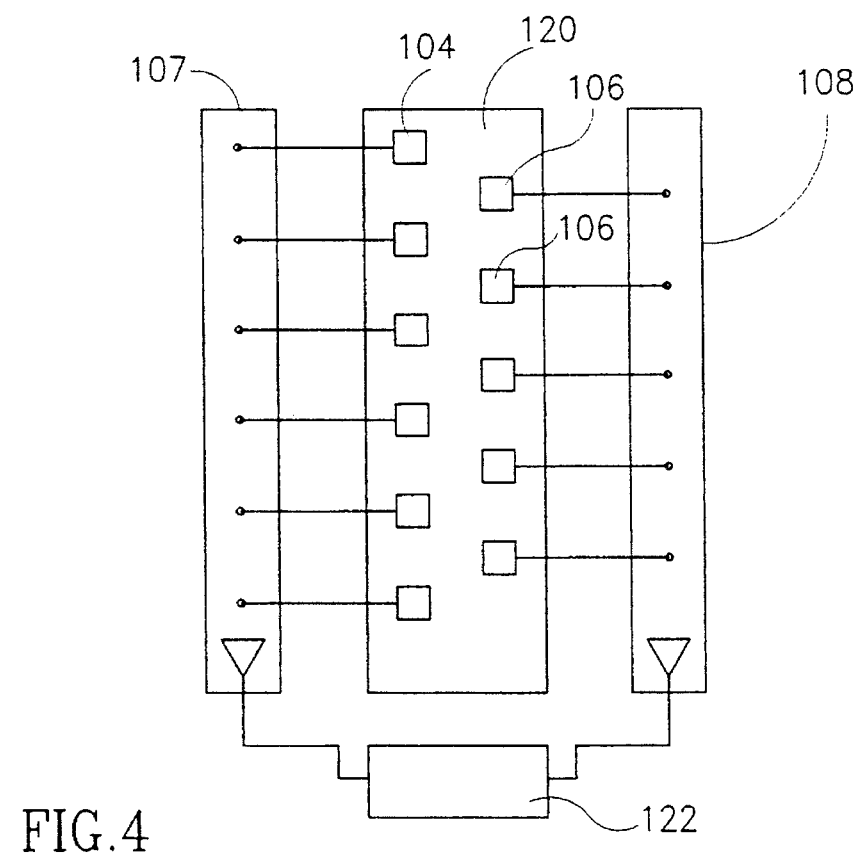
FIG. 4 shows a close-up view of the IR detector of the scanning RM of FIG. 3.

With reference now to FIG. 4, IR detector 120 typically comprises a staggered linear array 104 of typically 128 IR sensitive elements 106 for producing electric signals having intensities proportional to the IR energy impinging thereon. IR sensitive elements 106 are made from IR sensitive semiconductor material, including but not limited to CMT, commercially available from Amber Engineering, Goleta, Calif., USA. The signals from even and odd IR sensitive elements 106 are amplified by FPPs 107 and 108, respectively, before transmission to processing means 122.

While the invention has been described with respect to a limited number of embodiments, it will be appreciated that many variations, modifications and other applications of the invention may be made.

What is claimed is:

1. A staring infrared microscope, comprising:
   (a) optics for focusing a magnified image of an object onto a 2D array detector of IR sensitive elements;
   (b) processing means for processing the information received from said 2D array detector including controlling the integration time of said 2D array detector as a function of the magnification of the object to generate a thermal descriptive image of object; and
   (c) output means for displaying the thermal descriptive image.

2. A microscope as claimed in claim 1, wherein said optics are diffraction limited optics.

3. A microscope as claimed in claim 1, wherein said 2D array detector is made from InSb, CdHgTe or GaAs material.

4. A microscope as claimed in claim 1, further comprising a cold shield for reducing thermal noise.

5. A microscope as claimed in claim 4, wherein the dimensions of the aperture of said cold shield are configured to the dimensions of the virtual image entrance pupil of said optics.

6. A microscope as claimed in claim 1, wherein said 2D array detector is mounted on a cold finger.

7. A microscope as claimed in claim 1, further comprising a dewar assembly for housing said 2D array detector.

8. A microscope as claimed in claim 1, further comprising display means for displaying a visible light image of the object.

9. A microscope as claimed in claim 8, wherein said display means incorporates a CCD microscope camera.

* * * * *

UNITED STATES PATENT AND TRADEMARK OFFICE
CERTIFICATE OF CORRECTION

PATENT NO. : 5,512,749
DATED : April 30, 1996
INVENTOR(S) : Gavriel J. IDDAN et al.

It is certified that error appears in the above-indentified patent and that said Letters Patent is hereby corrected as shown below:

ON THE TITLE PAGE:

Item [30] Foreign Application Priority Data, replace "[IT] Italy" with "[IL] Israel".

Signed and Sealed this

Ninth Day of July, 1996

Attest:

BRUCE LEHMAN

*Attesting Officer*           *Commissioner of Patents and Trademarks*